United States Patent Office 3,312,690
Patented Apr. 4, 1967

3,312,690
SYDNONIMINE DERIVATIVES
Katsutada Masuda, Ashiya, and Yoshio Imashiro, Nishinomiya, Japan, assignors to Takeda Chemical Industries, Ltd., Osaka, Japan
No Drawing. Continuation of application Ser. No. 462,421, June 8, 1965. This application Apr. 29, 1966, Ser. No. 546,468
Claims priority, application Japan, June 8, 1964, 39/32,329
23 Claims. (Cl. 260—239)

This application is a continuation of application Ser. No. 462,421, filed June 8, 1965, now abandoned.

This invention relates to novel sydnonimine derivatives useful as medicines, and to the preparation thereof. More particularly, the invention relates to novel sydnonimine derivatives of the general Formula I and acid salts thereof which have characteristic effects as muscle relaxants, coronary and peripheral vessel dilators, heart action accelators, etc.:

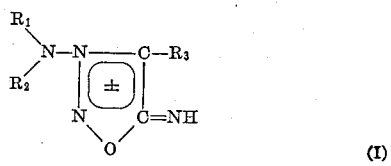

wherein $R_3$ is a hydrogen atom or a lower alkyl group (having one to five carbon atoms), and each of $R_1$ and $R_2$ stands for a lower alkyl group having one to five carbon atoms or a lower alkenyl group having one to five carbon atoms, and $R_1$ and $R_2$ taken together with the adjacent N-atom stand for morpholino, pipecolino, a

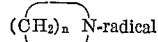

wherein $n$ is 4, 5 or 6, an

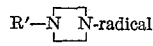

wherein R′ is an alkyl group having one to five carbon atoms, or an

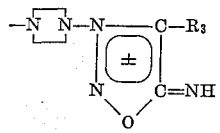

wherein $R_3$ has the same meaning as above.

Although compounds having the sydnonimine ring with substituents involving the C—N linkage at the 3-positioned nitrogen atom in the ring are known, compounds having the sydnonimine ring with substituents involving the N—N linkage at the 3-positioned nitrogen atom in the ring have not hitherto been known or produced.

The present inventors have succeeded in preparing these new sydnonimine compounds, and discovered that the new compounds have, an non-toxic quantitative levels, a stronger effect in lowering blood pressure by dilating peripheral vessels than can be achieved with nitrite-type medicines, and also have a muscle relaxing effect, similar to that of papaverine, in relaxing coronary vessels and in accelerating the activity of the heart, and that they are useful as medicines for the therapy of hypertension, Raynaud's disease, cardiac insufficiency, etc.

It is an object of the present invention to provide the new and useful sydnonimine compounds of Formula I.

Another object of the invention is to provide the means to produce these new sydnonimine compounds.

Further objects of the invention will become clear from the following descriptions.

In the Formula I, $R_3$ stands for H (hydrogen atom) or a lower alkyl group (having one to five carbon atoms, such as methyl, ethyl, propyl, isopropyl, n-butyl, tert.-butyl or amyl). $R_1$ and $R_2$ each stands for a lower alkyl group having one to five carbon atoms, such as methyl, ethyl, propyl, isopropyl, n-butyl, tert.-butyl and amyl, or a lower alkenyl group having one to five carbon atoms such as vinyl, allyl and butenyl. $R_1$ and $R_2$ may form together with the adjacent nitrogen atom a ring such as morpholino, pipecolino, a

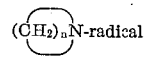

wherein $n$ is 4, 5 or 6, which is exemplified by piperidino, pyrrolidino or hexahydro-azepinyl, an

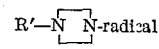

wherein R′ is a lower alkyl group having one to five carbon atoms such as methyl, ethyl, propyl, isopropyl, n-butyl, tert.-butyl or amyl, or an

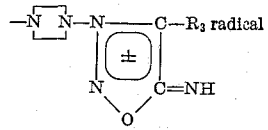

wherein $R_3$ has the same meaning as above.

The sydnonimine compounds of Formula I, which form salts with various acids, are exemplified as follows:

3-dimethylamino-sydnonimine,
3-dimethylamino-4-methyl-sydnonimine,
3-diethylamino-sydnonimine,
3-diethylamino-4-methyl-sydnonimine,
3-di-n-butylamino-sydnonimine,
3-di-n-butylamino-4-methyl-sydnonimine,
3-di-n-butylamino-4-ethyl-sydnonimine,
3-methylallylamino-sydnonimine,
3-diallylamino-sydnonimine,
3-piperidino-sydnonimine,
3-piperidino-4-methyl-sydnonimine,
3-methylallylamino-4-methyl-sydnonimine,
3-piperidino-4-n-butyl-sydnonimine,
3-hexahydroazepinyl-sydnonimine,
3-hexahydroazepinyl-4-methyl-sydnonimine,
3-morpholino-sydnonimine,
3-morpholino-4-methyl-sydnonimine,
3-morpholino-4-ethyl-sydnonimine,
3-pyrrolidino-sydnonimine,
3-pyrrolidino-4-methyl-sydnonimine,
3-pyrrolidino-4-butyl-sydnonimine,
3-pipecolino-sydnonimine,
3-pipecolino-4-n-butyl-sydnonimine,
3-pipecolino-4-propyl-sydnonimine,
3-methylethylamino-sydnonimine,
3-methylethylamino-4-methyl-sydnonimine,
3-(N-methyl-piperazino)-sydnonimine,
3-(N-ethylpiperazino)-sydnonimine,
3-(N-n-butylpiperazino)-sydnonimine,
3-(methylpiperazino)-4-methyl-sydnonimine,
3,3′-(1-4-piperazino-diyl)-bis-sydnonimine,
3,3′-(1,4-piperazino-diyl)-bis(4-methyl sydnonimine), etc.

These new compounds are produced as follows:

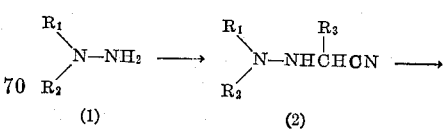

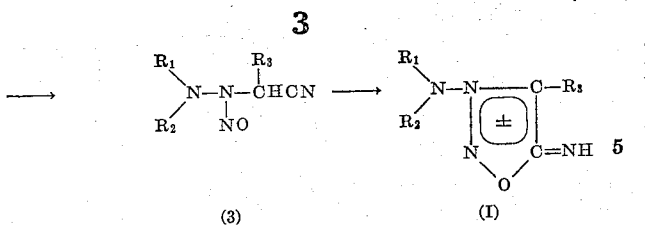

wherein $R_1$, $R_2$ and $R_3$ have the same meaning as above.

For the preparation of a cyanoalkyl hydrazine of Formula 2, a hydrazine of Formula 1 is subjected to cyanoalkylation. The reaction is generally completed by reacting the hydrazine of the Formula 1 with a cyanide and an aldehyde represented by the formula $R_3CHO$, wherein $R_3$ has the same meaning as above. As hydrazines (1), there are exemplified for example, N,N-dimethylhydrazine,
N,N-diethylhydrazine,
N,N-di-n-butylhydrazine,
N-methyl-N-n-butylhydrazine,
N-ethyl-N-n-butylhydrazine,
N,N-diamylhydrazine,
N-allyl-N-methylhydrazine,
N-allyl-N-ethylhydrazine,
N,N-diallylhydrazine,
N-butenyl-N-methylhydrazine,
N,N-dibutenylhydrazine,
N-aminopiperidine,
N-aminomorpholine,
N-aminopyrrolidine,
N-aminopipecoline,
N-aminohexahydroazepine,
N-amino-N'-methylpiperazine,
N-amino-N'-ethylpiperabine, and
N-amino-N'-sydnoniminopiperazine.

As aldehydes of formula $R_3CHO$, there are exemplified, for example, formaldehyde, acetaldehyde, propionaldehyde, butyraldehyde, isobutyraldehyde, valeraldehyde and caproaldehyde. Depending upon the sydnonimine desired, the corresponding hydrazine and aldehyde may be selected from the group mentioned above. As the cyanide, an alkali metal cyanide such as sodium cyanide or potassium cyanide or ammonium cyanide is effectively employed. The reaction of the hydrazine with the aldehyde and the cyanide is carried out, for example, by adding cyanide solution and aldehyde solution to hydrazine solution under cooling or at room temperature (20 to 30° C.). As the reaction solvent, water is generally employed, but other solvents, if they do not prevent the reaction from proceeding, may be used. The reaction may be carried out in the presence of catalyst (e.g. sodium bisulfate).

A compound of Formula 2 can also be obtained by reacting a hydrazine of Formula 1 with an hydroxyalkyl nitrile of the formula

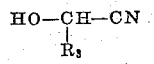

wherein $R_3$ has the same meaning as above, which is obtained, for example, by reaction of the corresponding aldehyde with alkali metal cyanide or ammonium cyanide. The reaction between the said hydrazine and hydroxyalkyl nitrile is carried out, for example, by mixing the two reaction components at room temperature in the presence or absence of solvent.

For the preparation of nitroso compound of Formula 3, a nitroso group is introduced into the cyanoalkyl hydrazine of the Formula 2. The nitrosation is completed in customary manners per se known, for example, by reacting cyanoalkyl hydrazine with nitroso compound such as alkali metal nitride (e.g. sodium nitrite, potassium nitrite) or ammonium nitride in an aqueous medium preferably under cooling, by passing nitrous fumes into a solution or suspension of the cyanoalkyl hydrazine, preferably under cooling, an organic solvent such as, for example, benzene, toluene, xylene, acetone, methyl alcohol, ethyl alcohol, ethyl ether, acetic acid, acetic acid ester or acetic anhydride being effectively used, by adding a solution of nitrosyl chloride to a solution of the cyanoalkyl hydrazine in the presence of an alkali salt of carboxylic acid such as, for example, sodium acetate or potassium acetate, or by reacting alkyl nitrite with the cyanoalkyl hydrazine.

Lastly, for the preparation of the objective sydnonimine compounds of Formula I, nitroso compound of Formula 3 is subjected to a ring-closure reaction. When the nitroso compound is unstable, the reaction mixture of the nitrosation may be directly subjected to the ring-closure reaction without separating the compound from the reaction mixture. The reaction is carried out, for example, by adding acid to the nitroso compound dissolved in water or an organic solvent. As the acid, there may be used, for example, inorganic acid such as hydrochloric acid, sulfuric acid, nitric acid or phosphoric acid, or strong organic acid such as picric acid. As the organic solvent, there may be used, for example, methyl alcohol, ethyl alcohol, isopropyl alcohol, ethyl ether, acetone, benzene, xylene, toluene, or tetrahydrofurane. The reaction generally proceeds at room temperature. It is preferable to add alcoholic solution of hydrochloric acid to the nitroso compound at room temperature to allow the reaction to take place, said alcohol being such as methyl alcohol, ethyl alcohol or isopropyl alcohol. Thus, the desired sydnonimine compounds are precipitated out of the reaction system in the form of its salt with the acid used. After completion of the ring-closure reaction, an organic solvent such as ethyl ether or acetone may be added to the reaction system in order to accelerate the precipitation of the desired product. The sydnonimine salt may be converted, in known manner, into free base or an other pharmaceutically acceptable salt such as formic, acetic, butyric, citric, ascorbic, salicyclic or para-aminosaliyclic acid.

Having high solubility in water, the present sydnonimine compounds or their salts are preferably administered in the form of an aqueous solution containing about 1 milligram of sydnonimine per 1 millilitre of water, and are generally administered per os but an injection may be also applied, the dose for an adult being selected from the range of about 5 to about 25 milligrams per day.

In order to further illustrate the present invention, the following examples are given. In these examples, temperatures are all in degrees centigrade, and the abbreviations "g.," "ml." and "N" (the latter when used to indicate solution strength) should be read as "gram(s)," "millilitre(s)" and "normality(ies)," respectively. Percentages are by weight.

*Example 1.*—To N-amino piperidine hydrochloride (21 g.) dissolved in water (20 ml.) are added, under ice-cooling and agitation, potassium cyanide (10 g.) dissolved in water (20 ml.) and 37 percent aqueous solution (12.5 g.) of formaldehyde and then the mixture is agitated for 7 hours at room temperature to give an oily layer. After standing overnight, the oily layer is extracted with ethyl ether, and the ethyl ether is removed from the extract by evaporation to leave reddish-brown oily substance.

Fractional distillation of the oily substance under reduced pressure gives, as light-yellow liquid, N-piperidino-cyanomethyl amine (11.2 g.) at 80° C. to 89° C./3 mm. Hg, or 120 to 128° C./22 mm. Hg. Its hydrochloride melts at 157° to 158° C.

The N-piperidino-cyanomethyl amine (5 g.) suspended in water (10 ml.) is dissolved homogeneously in the water as its hydrochloric acid salt by adding hydrochloric acid (5 ml.) diluted with water (10 ml.). To the aqueous solution, sodium nitrite (2.5 g.) dissolved in water (5 ml.) is added under ice-cooling and agitation to give an oily layer, which is then extracted twice, each time with ethyl ether (50 ml.). The extract is dried with sodium sulfate, then the ether is removed by evaporation to leave yellow oil. To the yellow oil is added 4 N methyl alcoholic solution (30 ml.) of hydrochloric acid, followed by removing the alcohol by evaporation to leave a white solid substance. The white solid is recrystallized from ethyl alcohol-anhydrous ethyl ether to obtain 3-piperidino sydnonimine hydrochloride (2.6 g.) in the form of colorless crystals having a melting point of 160 to 163° C. (with decomposition).

Analysis.—$C_7H_{13}N_4OCl$. Calculated: C, 41.08; H, 6.40; N, 27.86. Found: C, 41.40; H, 6.41; N, 27.61.

Example 2.—To N-amino morpholine hydrochloride (20 g.) dissolved in water (20 ml.) are added, under ice-cooling and agitation, potassium cyanide (10 g.) dissolved in water (20 ml.) and 37 percent aqueous solution of formaldehyde, and then agitation of the mixture is continued for 6 hours at room temperature to allow the reaction to take place. The reaction mixture is continuously extracted wtih ethyl ether for 8 hours. After removing the ethyl ether from the extract by evaporation the remaining yellow oil is subjected to fractional distillation under reduced pressure to isolate N-morpholino-cyanomethyl amine (44 g.) as light-yellow liquid at 96° C. to 108° C./0.4 mm. Hg, the hydrochloric acid salt of which has a melting point of 178 to 181° C. (with decomposition).

To the N-morpholino-cyanomethyl amine (3.9 g.) in water (5 ml.) concentrated hydrochloric acid (2.8 ml.) is added, and then under ice-cooling and agitation there is added sodium nitrite (2.5 g.) dissolved in water (4 ml.) to give an oily substance. The oily substance is extracted with ethyl ether and the extract is dried with sodium sulfate, followed by removing the ethyl ether by evaporation to leave yellow oily substance. To the yellow oily substance is added 4 N methyl alcoholic solution (20 ml.) of hydrochloric acid. After removing the methyl alcohol from the solution by evaporation, anhydrous ethyl ether is added to the residue to solidify it completely, followed by discarding the ethyl ether by decantation.

The remaining solid part is recrystallized from ethyl alcohol to obtain 3-morpholino-sydnonimine hydrochloride (0.5 g.) in the form of colorless crystals having a melting point of 171 to 173° C. (with decomposition).

Employment of N-amino-N'-methylpiperazine hydrochloride in place of N-aminomorpholine hydrochloride gives 3-(N-methylpiperazino)-sydnonimine hydrochloride in similar manner.

Example 3.—To N-aminopyrrolidine hydrochloride (2.4 g.) are added, under ice-cooling and agitation, potassium cyanide (1.3 g.) in water (5 ml.) and 37 percent aqueous solution (1.6 g.) of formaldehyde and then the mixture agitated for 4 hours at room temperature to allow the reaction to take place. The reaction mixture is extracted with ethyl ether, and the ethyl ether is removed from the extract by evaporation to leave reddish-brown oil, which is then subjected to fractional distillation under reduced pressure to isolate, as light-yellow liquid, N-pyrrolidino-cyanomethyl amine (1.2 g.) at 65 to 67° C./0.3 mm. Hg, the hydrochloric acid salt of which has a melting point of 159 to 161° C. (with decomposition).

To the N-pyrrolidino-cyanomethyl amine (2.0 g.) suspended in water (10 ml.), hydrochloric acid (1.5 ml.) is added under cooling, then into the mixture is dropped sodium nitrite (3 g.) in water (5 ml.) to give an oily substance, which is then extracted with ethyl ether. 4 N methyl alcoholic solution (10 ml.) of hydrochloric acid is added to the ether extract under cooling to precipitate 3-pyrrolidino sydnonimine hydrochloride as colorless crystals with one mole of crystal water.

The crystals recrystallized from ethyl alcohol have a melting point of 175 to 176° C. (with decomposition).

Analysis.—$C_6H_{11}N_4OCl \cdot H_2O$. Calculated: C, 34.52; H, 6.23; N, 26.85. Found: C, 34.36; H, 6.23; N, 26.72.

Example 4.—N,N-dimethyl hydrazine (6 g.) dissolved in water (10 ml.) is mixed with concentrated hydrochloric acid (10 ml.). To the mixture are added, under cooling and agitation, potassium cyanide (7 g.) dissolved in water (10 ml.) and 37 percent aqueous solution (8.1 g.) of formaldehyde, followed by further agitation for 2.5 hours at room temperature, to allow the reaction to take place. After the reaction mixture is extracted with ethyl ether, the ethyl ether is removed by evaporation to leave yellow oil, which is then subjected to fractional distillation under reduced pressure to isolate, as light-yellow liquid, N,N-dimethyl-N'-cyanomethyl hydrazine (4.8 g.) at 53 to 55° C./2 mm. Hg.

The N,N-dimethyl-N'-cyanomethyl hydrazine (4 g.) dissolved in water (5 ml.) is mixed with hydrochloric acid (3.6 g.).

Sodium nitrite (4 g.) dissolved in water (5 ml.) is added dropwise to the mixture under cooling with Dry Ice-acetone solution, whereupon white powdery substance precipitates out. The precipitate is separated out, washed with cold water and at once dissolved in methyl alcoholic-hydrochloric acid.

The alcohol is removed from the solution by evaporation to leave white solid substance. The white solid substance is then recrystallized from ethyl alcohol to obtain 3-dimethyl amino sydnonimine hydrochloride (3.3 g.) in the form of colorless crystals having a melting point of 180 to 181° C. (with decomposition).

Analysis.—$C_4H_9N_4OCl$. Calculated: C, 19.19; H, 5.51; N, 34.04. Found: C, 28.91; H, 5.56; N, 33.85.

Example 5.—To N-amino-α-pipecoline (20 g.) dissolved in a mixture of water (20 ml.) and concentrated hydrochloric acid (19 g.) is added, under ice-cooling and agitation, potassium cyanide (11.5 g.) dissolved in a small amount of water. To the mixture is added dropwise 37 percent aqueous solution (14.5 g.) formaldehyde under agitation, followed by furthher agitation for a while. The resulting oily substance is extracted with ethyl ether. After drying with anhydrous potassium carbonate and removing the ether by evaporation, the extract is subjected to fractional distillation under reduced pressure to isolate N-α-pipecolino-cyanomethyl amine (22 g.) at 70 to 80° C./1 mm. Hg, whose picrate has a melting point of 138° C. (with decomposition).

To the N-α-pipecolino-cyanomethyl amine (5 g.) dissolved in a mixture of water (5 ml.) and hydrochloric acid (3.7 g.) is added, under cooling and agitation, sodium nitrite (2.5 g.) dissolved in a small amount of water, followed by further agitation for a while to give a brown oily substance, which is extracted with ethyl ether. The extract is dried with anhydrous potassium carbonate, and the ethyl ether is removed from the extract by evaporation to leave an oily product (5 g.), which is mixed with a methyl alcoholic solution of hydrochloric acid.

After standing for a while, the methyl alcohol is removed from the mixture by evaporation at room temperature to give white needle-like crystals (3 g.), which is recrystallized from ethyl alcohol to obtain 3-α-pipecolino sydnonimine hydrochloride (1.5 g.) having a melting point of 157° C. (with decomposition).

Analysis.—$C_8H_{15}N_4OCl$. Calculated: C, 43.94; H, 6.91; N, 25.62. Found: C, 43.45; H, 7.08; N, 26.16.

Example 6.—Hydroxyacetonitrile (2.8 g.) is added dropwise to N,N-(di-n-butyl)-hydrazine (7.2 g.) to allow the reaction to take place. After about 15 hours, the upper part of the reaction mixture which is divided into two layers is subjected to fractional distillation under reduced pressure, which gives N-(di-n-butylamino)cyanomethyl amine (3.3 g.) at 85° C./2 mm. Hg. To the N-(di-n-butylamino)cyanomethyl amine (5 g.) dissolved in a mixture of water (10 ml.) and hydrochloric acid (3 ml.) sodium nitrite (2 g.) dissolved in a small amount of water is added to produce a yellow oily substance, which is then extracted with ethyl ether. The extract is dried with anhydrous potassium carbonate, and the ether is removed from the ether extract by evaporation to leave a yellow oily substance. The oily substance is dissolved in methyl alcohol and dry hydrogen chloride gas is introduced into the solution. The methyl alcohol is removed by evaporation to leave an oily substance. The oily substance is washed two or three times with anhydrous ethyl ether to obtain white solid matter.

The white solid matter is recrystallized from methyl alcohol-anhydrous ethyl ether to give 3-(di-n-butylamino) sydnonimine hydrochloride having a melting point of 108° C. (with decomposition).

*Analysis.*—$C_{10}H_{21}N_4OCl$. Calculated: C, 48.28; H, 8.51; N, 22.52. Found: C, 48.29; H, 8.50; N, 22.47.

*Example 7.*—To N-aminopiperidine hydrochloride (15 g.) dissolved in water (15 ml.) is added, under cooling and agitation, potassium cyanide (8 g.) dissolved in a small amount of water. After further agitation of the mixture for a while, 80 percent aqueous solution (6 g.) of acetaldehyde is added dropwise into the mixture, whereupon in half an hour an oily substance separates out, which is extracted with ethyl ether. The extract is dried, followed by removal of the ethyl ether from the extract by evaporation. The residue is subjected to fractional distillation under reduced pressure to distill N-piperidino-α-cyanoethyl amine (6 g.) at 60 to 70° C./6 to 7 mm. Hg. Picric acid salt of the N-piperidino-α-cyanoethyl amine has a melting point of 131° C.

To the N-piperidino-α-cyanoethyl amine (6 g.) dissolved in a mixture of water (20 ml.) and hydrochloric acid (4 g.), sodium nitrite (3 g.) dissolved in a small amount of water is added under agitation to yield an oily substance, which is extracted with ethyl ether. The extract is dried with anhydrous potassium carbonate, and the ether is removed from the extract by evaporation to leave nitroso compound as an oily substance. The nitroso compound is mixed with methyl alcoholic solution of hydrochloric acid, and then after standing for a while, the methyl alcohol is removed from the mixture by evaporation. The remaining oily substance is washed several times with anhydrous ethyl ether. Thus prepared solid substance is recrystallized from methyl alcohol-ethyl ether to obtain 3-piperidino-4-methyl sydnonimine hydrochloride having a melting point of 167 to 170° C. (with decomposition).

*Analysis.*—$C_8H_{15}N_4OCl$. Calculated: C, 43.94; H, 6.91; N, 25.62. Found: C, 44.21; H, 6.89; N, 25.31.

Separately, the nitroso compound obtained as above is dissolved in ethyl ether and the solution is mixed with picric acid dissolved in ethyl alcohol-ethyl ether, followed by removal of the solvent by evaporation. Thus obtained yellow oily substance is washed with ethyl ether to produce yellow solid.

The solid is recrystallized from ethyl ether-ethyl alcohol to obtain 3-piperidino-4-methyl sydnonimine picrate having a melting point of 148° C. (with decomposition).

*Analysis.*—$C_{14}H_{17}N_7O_8$. Calculated: C, 40.88; H, 4.17; N, 23.84. Found: C, 41.02; H, 4.23; N, 23.58.

*Example 8.*—N,N'-diaminopiperazine hydrochloride (3.8 g.) dissolved in water (30 ml.) is neutralized with sodium bicarbonate (3.5 g.).

Formaldehyde-sodium bisulfite monohydrate (6.1 g.) dissolved in water (20 ml.) is added to the neutralized solution and the mixture is heated at 70° C. for 3 hours on a water bath, followed by evaporating to dryness, to leave white solid substance.

To the white solid substance dissolved in water (20 ml.) is added potassium cyanide (3.0 g.). The mixture is heated at 60° C. for about 1 hour on a water bath to precipitate out N,N'-bis-(cyanomethylamino)piperazine in the form of colorless needle-like crystals (2.3 g.).

To the N,N'-bis-(cyanomethylamino)piperazine (2.0 g.) dissolved in a mixture of water (30 ml.) and hydrochloric acid (2 ml.) is added sodium nitrite (2.0 g.) dissolved in water (7 ml.) to precipitate out a nitroso compound in the form of white powder.

To the nitroso compound collected by filtration is added hydrochloric acid (10 ml.) under agitation. The mixture is dissolved in water (50 ml.) under heating and kept standing for a while to precipitate out 3,3'-(1,4-piperazinediyl)-bis sydnonimine hydrochloride in the form of colorless crystals having a melting point of 242 to 243° C. (with decomposition).

*Analysis.*—$C_8H_{14}O_2N_8Cl_2 \cdot 2H_2O$. Calculated: C, 26.59; H, 4.99; N, 31.02. Found: C, 27.03; H, 5.09; N, 30.42.

*Example 9.*—To N-methyl-N-allyl hydrazine (5.2 g.) dissolved in water (30 ml.) is added first formaldehyde-sodium bisulfite monohydrate (5.0 g.) under agitation, then potassium cyanide (4.0 g.), and the mixture is heated at 60° C. on a water bath to give an oily layer, which is extracted with ethyl ether. The extract is dehydrated with anhydrous potassium carbonate, and the ethyl ether is evaporated. The resultant is subjected to fractional distillation under reduced pressure, which gives N-(methylallylamino)-cyanomethylamine (3.0 g.) at 101 to 105° C./20 mm. Hg.

To the N-(methylallylamino)-cyanomethylamine (1.9 g.) dissolved in a mixture of water (10 ml.) and hydrochloric acid (1.5 ml.), sodium nitrite (1.5 g.) dissolved in water (4 ml.) is added dropwise under cooling to produce a brown oily layer, which is then extracted with ethyl ether. The extract is dried with anhydrous potassium carbonate and the ethyl ether is removed by evaporation to leave a residue, which is immediately dissolved in anhydrous methyl alcohol. Dry hydrogen chloride is introduced into the solution, and the methyl alcohol is removed by evaporation from the solution to leave syrupy substance.

The syrupy substance is washed with ethyl ether, dissolved in a small amount of water and mixed with an aqueous solution of picric acid to produce yellow needle-like crystals of 3-methylallylamino-sydnonimine picrate. 3-methylallylamino-sydnonimine picrate recrystallized from hot water has a melting point of 131 to 134° C.

*Analysis.*—$C_{12}H_{13}N_7O_8$. Calculated: C, 37.60; H, 3.42; N, 25.58. Found: C, 37.36; H, 3.56; N, 25.50.

What is claimed is:

1. A sydnonimine compound of the formula

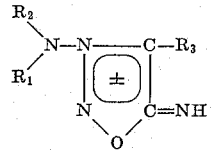

wherein $R_3$ is a member selected from the group consisting of H and alkyl of one to five carbon atoms, and each of $R_1$ and $R_2$ is a member selected from the group consisting of alkyl of one to five carbon atoms and alkenyl of one to five carbon atoms, and $R_1$ and $R_2$ taken together with the adjacent N-atom stand for a member selected from the group consisting of morpholino, pipecolino, a

wherein $n$ is 4, 5 or 6, an

wherein R' is alkyl of one to five carbon atoms, and an

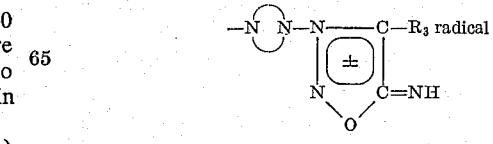

wherein $R_3$ has the same meaning as above.

2. A pharmaceutically acceptable salt of a sydnonimine compound according to claim 1.

3. Hydrochloride of a sydnonimine compound according to claim 1.

4. A compound according to claim 1, namely, 3-piperidino-sydnonimine.

5. A compound according to claim 2, namely, the 3-piperidino-sydnonimine hydrochloride of formula $$C_7H_{13}N_4OCl$$

6. A compound according to claim 1, namely, 3-morpholino-sydnonimine.

7. A compound according to claim 2, namely, the 3-morpholino-sydnonimine hydrochloride of the melting point 171–173° C.

8. A compound according to claim 1, namely 3-pipecolino-sydnonimine.

9. A compound according to claim 2, namely, the 3-pipecolino-sydnonimine hydrochloride of the formula $$C_6H_{11}N_4OCl \cdot H_2O$$

10. A compound according to claim 1, namely, 3-dimethylamino-sydnonimine.

11. A compound according to claim 2, namely, the 3-dimethylamino-sydnonimine hydrochloride of the formula $C_4H_9N_4OCl$.

12. A compound according to claim 1, namely 3-di-n-butylamino-sydnonimine.

13. A compound according to claim 2, namely, the 3-di-n-butylamino-sydnonimine hydrochloride of the formula $C_8H_{15}N_4OCl$.

14. A compound according to claim 1, namely 3-pyrrolidino-sydnonimine.

15. A compound according to claim 2, namely, the 3-pyrrolidino-sydnonimine hydrochloride of formula $C_{10}H_{21}N_4OCl$.

16. A compound according to claim 1, namely, 3-piperidino-4-methyl-sydnonimine.

17. A compound according to claim 2, namely, the 3-piperidino-4-methyl-sydnonimine hydrochloride of formula $C_8H_{15}N_4OCl$.

18. A compound according to claim 1, namely, 1,4 bis-(sydnoniminyl 3,3′)piperazine.

19. A compound according to claim 2, namely, the 1,4 bis-(sydnoniminyl 3,3′)piperazine hydrochloride of formula $C_8H_{14}O_2N_8Cl_2 \cdot 2H_2O$.

20. A compound according to claim 1, namely, 3-hexahydroazepinyl-sydnonimine.

21. A compound according to claim 1, namely, 3-methyllallylamino-sydnonimine.

22. A nitroso compound of the formula

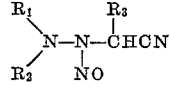

wherein $R_3$ is a member selected from the group consisting of H and alkyl of one to five carbon atoms, and each of $R_1$ and $R_2$ is a member selected from the group consisting of alkyl of one to five carbon atoms and alkenyl of one to five carbon atoms, and $R_1$ and $R_2$ taken together with the adjacent N-atom stand for a member selected from the group consisting of morpholino, pipecolino, a

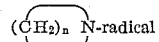

wherein $n$ is 4, 5 or 6, and

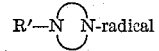

wherein $R'$ is alkyl of one to five carbon atoms, and an

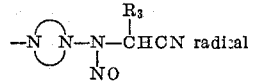

wherein $R_3$ has the same meaning as above.

23. An N-cyanoalkyl hydrazine compound of the formula

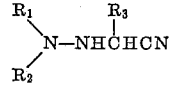

wherein $R_3$ is a member selected from the group consisting of H and alkyl of one to five carbon atoms, and each of $R_1$ and $R_2$ is a member selected from the group consisting of alkyl of one to five carbon atoms and alkenyl of one to five carbon atoms, and $R_1$ and $R_2$ taken together with the adjacent N-atom stand for a member selected from the group consisting of morpholino, pipecolino, a

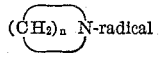

wherein $n$ is 4, 5 or 6, an

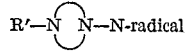

wherein $R'$ is alkyl of one to five carbon atoms, and an

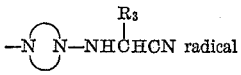

wherein $R_3$ has the same meaning as above.

No references cited.

ALEX MAZEL, *Primary Examiner.*

JOSE TOVAR, *Assistant Examiner.*